United States Patent
Park et al.

(10) Patent No.: US 11,267,131 B2
(45) Date of Patent: Mar. 8, 2022

(54) MOBILE HOME ROBOT AND CONTROLLING METHOD OF THE MOBILE HOME ROBOT

(71) Applicant: SAMSUNG ELECTRONICS CO., LTD., Suwon-si (KR)

(72) Inventors: Chan-ju Park, Seoul (KR); Eun-seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 16/239,898

(22) Filed: Jan. 4, 2019

(65) Prior Publication Data

US 2019/0202062 A1 Jul. 4, 2019

(30) Foreign Application Priority Data

Jan. 4, 2018 (KR) ........................ 10-2018-0001359

(51) Int. Cl.
*B25J 11/00* (2006.01)
*G01C 21/20* (2006.01)
(Continued)

(52) U.S. Cl.
CPC .......... *B25J 11/0005* (2013.01); *B25J 11/008* (2013.01); *G01C 21/005* (2013.01);
(Continued)

(58) Field of Classification Search
USPC ............................................... 700/245–264
See application file for complete search history.

(56) References Cited

U.S. PATENT DOCUMENTS 9,210,534 B1 * 12/2015 Matthieu ................ H04L 67/18
9,436,186 B2    9/2016 Oh et al.
(Continued)

FOREIGN PATENT DOCUMENTS

EP      3 619 004        3/2020
KR      10-1239284       3/2013
(Continued)

OTHER PUBLICATIONS

International Search Report and Written Opinion dated Apr. 9, 2019, issued in International Application No. PCT/KR2018/016188.
(Continued)

*Primary Examiner* — Jonathan L Sample
(74) *Attorney, Agent, or Firm* — Nixon & Vanderhye P.C.

(57) ABSTRACT

A mobile home robot is provided. The mobile home robot includes a storage configured to store in-home map data, a communication interface comprising communication interface circuitry, a camera, a user interface, and a processor configured to, based on device information of a plurality of Internet of things (IoT) devices installed in the home and an image captured through the camera while the mobile home robot moves around in the home, generate location information of each of the plurality of IoT devices, to map the generated location information with the map data, and in response to a user command being received through the user interface, to provide an IoT device location-based service based on the map data with which the location information is mapped.

18 Claims, 7 Drawing Sheets

(51) Int. Cl.
  *G01C 21/00*   (2006.01)
  *G05D 1/02*    (2020.01)
  *H04L 67/12*   (2022.01)
(52) U.S. Cl.
  CPC ......... *G01C 21/206* (2013.01); *G05D 1/0274* (2013.01); *H04L 67/12* (2013.01); *G05D 2201/0214* (2013.01); *G05D 2201/0217* (2013.01)

(56) References Cited

U.S. PATENT DOCUMENTS

| | | | | |
|---|---|---|---|---|
| 9,615,066 | B1* | 4/2017 | Tran | G08G 1/09 |
| 10,206,081 | B1* | 2/2019 | Hall | H04W 76/11 |
| 10,664,502 | B2* | 5/2020 | Chambers | G06Q 30/0261 |
| 10,817,760 | B2* | 10/2020 | Pradeep | G06F 1/324 |
| 2014/0316636 | A1* | 10/2014 | Hong | G01C 21/206 |
| | | | | 701/27 |
| 2015/0097689 | A1* | 4/2015 | Logue | G08B 25/003 |
| | | | | 340/632 |
| 2015/0109104 | A1* | 4/2015 | Fadell | H04L 67/12 |
| | | | | 340/5.65 |
| 2015/0145643 | A1* | 5/2015 | Fadell | G07C 9/27 |
| | | | | 340/5.51 |
| 2015/0347114 | A1* | 12/2015 | Yoon | H04L 12/2832 |
| | | | | 235/375 |
| 2015/0358777 | A1* | 12/2015 | Gupta | H04L 12/2807 |
| | | | | 370/254 |
| 2015/0372832 | A1* | 12/2015 | Kortz | G05D 23/1904 |
| | | | | 700/278 |
| 2016/0121229 | A1 | 5/2016 | Guo | |
| 2016/0148417 | A1* | 5/2016 | Kim | G05D 1/0274 |
| | | | | 345/419 |
| 2016/0250752 | A1* | 9/2016 | Djugash | B25J 9/161 |
| | | | | 700/264 |
| 2016/0260135 | A1* | 9/2016 | Zomet | H04L 12/2834 |
| 2016/0375579 | A1* | 12/2016 | Muttik | B64C 39/024 |
| | | | | 700/250 |
| 2016/0379121 | A1 | 12/2016 | Ge et al. | |
| 2017/0048077 | A1* | 2/2017 | Hou | H04W 4/06 |
| 2017/0155720 | A1* | 6/2017 | Song | B60R 16/023 |
| 2017/0187807 | A1* | 6/2017 | Clernon | H04L 41/0806 |
| 2017/0225334 | A1* | 8/2017 | Deyle | G08B 13/2491 |
| 2017/0238129 | A1 | 8/2017 | Maier et al. | |
| 2018/0178372 | A1* | 6/2018 | Lee | G10L 15/22 |
| 2018/0317725 | A1* | 11/2018 | Lee | A47L 11/202 |
| 2018/0321687 | A1* | 11/2018 | Chambers | G06F 16/29 |

FOREIGN PATENT DOCUMENTS

| | | |
|---|---|---|
| KR | 10-2014-0128021 | 11/2014 |
| KR | 10-2017-0048815 | 5/2017 |
| KR | 10-2017-0071212 | 6/2017 |
| KR | 10-1773768 | 9/2017 |
| KR | 10-1783788 | 10/2017 |
| WO | 2018/204019 | 11/2018 |

OTHER PUBLICATIONS

Extended Search Report and Written Opinion dated Jul. 31, 2020 in counterpart European Patent Application No. 18897910.8.
Korean Office Action dated Nov. 25, 2021 for KR Application No. 10-2018-0001359.

* cited by examiner

MOBILE HOME ROBOT AND CONTROLLING METHOD OF THE MOBILE HOME ROBOT

CROSS-REFERENCE TO RELATED APPLICATION

This application is based on and claims priority under 35 U.S.C. § 119 to Korean Patent Application number 10-2018-0001359, filed on Jan. 4, 2018, in the Korean Intellectual Property Office, and the disclosure of which is incorporated by reference herein in its entirety.

BACKGROUND

1. Field

The disclosure relates to a mobile home robot and a controlling method of the mobile home robot. For example, the disclosure relates to a mobile home robot for controlling Internet of things (IoT) devices in the home and a controlling method of the mobile home robot.

2. Description of Related Art

Thanks to the recent advancement of Internet of things (IoT) technology, IoT devices such as home appliances, lighting devices, sound devices, and display devices are connected to a hub device in the home to form an IoT network environment.

In such an IoT environment, the need to receive a convenient and optimized service has increased and accordingly, a technology for providing an interactive service through a fixed IoT hub device has been developed.

To provide an optimized service to a user through IoT devices installed in the home, it is important to identify an accurate location of each of the IoT devices. However, in the related-art fixed-type IoT hub device, it is not possible to automatically identify accurate locations of the IoT devices in the home and thus, there is a limit to provide an optimized service.

Even if a user inputs an installation location of an IoT device via a hub device, mobile IoT devices such as speakers, light fixtures, fans, cleaners, air cleaners, and the like are used by the user while changing their positions and thus, it is inconvenient that the user has to input the changed position of the IoT device every time.

In addition, in a case in which a new IoT device is to be installed in the home, or even when settings of an IoT device are changed due to a change of location, it is necessary that the user performs new registration or setting change one by one via a hub device.

Accordingly, a technology to automatically identify accurate locations of IoT devices installed in the home and provide an optimized service for users is demanded.

The above information is presented as background information only to assist with an understanding of the disclosure. No determination has been made, and no assertion is made, as to whether any of the above might be applicable as prior art with regard to the disclosure.

SUMMARY

The disclosure addresses at least the above-mentioned problems and/or disadvantages and provides at least the advantages described below. Accordingly, an aspect of the disclosure is to provide a mobile home robot which is capable of automatically identifying accurate locations of IoT devices in the home and providing a convenient and optimized and/or improved IoT device location-based service, and a controlling method of the mobile home robot.

In accordance with an aspect of the disclosure, a mobile home robot is provided. The mobile home robot includes a storage in configured to store in-home map data, a communication interface comprising interface circuitry, a camera, a user interface, and a processor configured to generate location information of each of the plurality of IoT devices based on device information of a plurality of Internet of things (IoT) devices installed in the home and an image captured through the camera while the mobile home robot moves around in the home, to map the generated location information with the map data, and to provide an IoT device location-based service based on the map data with which the location information is mapped in response to a user command being received through the user interface.

The processor may obtain an image of each of the plurality of IoT devices from an external server based on the device information, recognize each of the plurality of IoT devices by comparing the obtained image with the captured image, and generate location information of the recognized each of the plurality of IoT devices based on the captured image.

The camera may include at least one of a three-dimensional (3D) camera and a stereo camera. The location information may include at least two of coordinate information of each of the plurality of IoT devices on the map data, size information and direction information of each of the plurality of IoT devices, and information about a height at which each of the plurality of IoT devices is located.

The user interface may include a microphone. The processor may map semantic information regarding the location information of each of the plurality of IoT devices with the map data, and based on a user voice command being received through the microphone, perform an operation corresponding to the user voice command using the map data with which the semantic information is mapped.

The processor may update the map data and the location information of each of the plurality of IoT devices on predetermined cycles based on information obtained while the mobile home robot moves around in the home.

The processor may transmit the location information and/or the map data with which the location information is mapped to a smartphone of a user and/or at least one of the plurality of IoT devices.

The processor may, based on a user command for controlling one IoT device from among the plurality of IoT devices being input, generate a control command corresponding to the user command based on a position of a user inputting the user command and location information of the one IoT device, and transmit the generated control command to the one IoT device.

The processor may, based on a user command for controlling one IoT device from among the plurality of IoT devices being input, determine whether it is appropriate that the one IoT device performs an operation corresponding to the user command based on a distance between a user inputting the user command and the one IoT device, based on determining that it is appropriate that the one IoT device performs an operation corresponding to the user command, transmit a control command corresponding to the user command to the one IoT device, and based on determining that it is inappropriate that the one IoT device performs the operation corresponding to the user command, provide a notification informing that the one IoT device is not capable of performing the user command through the user interface.

The processor may determine context information of a user based on a user image captured through the camera, and transmit a control command for changing an operation mode of at least one IoT device from among the plurality of IoT devices to the at least one IoT device.

The user interface may include a microphone and a speaker. The processor may, in response to a user voice command for registration of a new IoT device being received, obtain device information of the new IoT device from an external server based on an image of the new IoT device captured through the camera, and provide an interactive service for registration of the new IoT device based on the obtained device information of the new IoT device.

In accordance with another aspect of the disclosure, a controlling method of a mobile home robot is provided. The controlling method includes, based on device information of a plurality of Internet of things (IoT) devices installed in the home and an image captured through the camera while the mobile home robot moves around in the home, generating location information of each of the plurality of IoT devices, mapping the generated location information with the map data, and providing an IoT device location-based service based on the map data with which the location information is mapped in response to a user command.

The generating the location information may include obtaining an image of each of the plurality of IoT devices from an external server based on the device information, recognizing each of the plurality of IoT devices by comparing the obtained image with the captured image, and generating location information of the recognized each of the plurality of IoT devices based on the captured image.

The camera may include at least one of a three-dimensional (3D) camera and a stereo camera. The location information may include at least two of coordinate information of each of the plurality of IoT devices on the map data, size information and direction information of each of the plurality of IoT devices, and information about a height at which each of the plurality of IoT devices is located.

The controlling method may further include mapping semantic information regarding the location information of each of the plurality of IoT devices with the map data. The providing the IoT device location-based service may include, based on a user voice command being received, performing an operation corresponding to the user voice command using the map data with which the semantic information is mapped.

The controlling method may further include updating the map data and the location information of each of the plurality of IoT devices on predetermined cycles based on information obtained while the mobile home robot moves around in the home.

The controlling method may further include transmitting the location information or the map data with which the location information is mapped to a smartphone of a user or at least one of the plurality of IoT devices.

The providing the IoT device location-based service may include, based on a user command for controlling one IoT device from among the plurality of IoT devices being input, generating a control command corresponding to the user command based on a position of a user inputting the user command and location information of the one IoT device, and transmitting the generated control command to the one IoT device.

The providing the IoT device location-based service may include, based on a user command for controlling one IoT device from among the plurality of IoT devices being input, determining whether it is appropriate that the one IoT device performs an operation corresponding to the user command based on a distance between a user inputting the user command and the one IoT device, based on determining that it is appropriate that the one IoT device performs an operation corresponding to the user command, transmitting a control command corresponding to the user command to the one IoT device, and based on determining that it is inappropriate that the one IoT device performs the operation corresponding to the user command, providing a notification informing that the one IoT device is not capable of performing the user command through the user interface.

The controlling method may further include determining context information of a user based on a user image captured through the camera, and transmitting a control command for changing an operation mode of at least one IoT device from among the plurality of IoT devices to the at least one IoT device.

The controlling method may further include, in response to a user voice command for registration of a new IoT device being received, obtaining device information of the new IoT device from an external server based on an image of the new IoT device captured through the camera, and providing an interactive service for registration of the new IoT device based on the obtained device information of the new IoT device.

According to the various example embodiments described above, a mobile home robot can automatically identify accurate locations of Internet of things (IoT) devices in the home. Accordingly, a user can be provided with a convenient and optimized IoT device location-based service solely from interaction with a mobile home robot.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following detailed description, taken in conjunction with the accompanying drawings, in which.

The same reference numerals are used to represent the same elements throughout the drawings.

DETAILED DESCRIPTION

Figure 1:
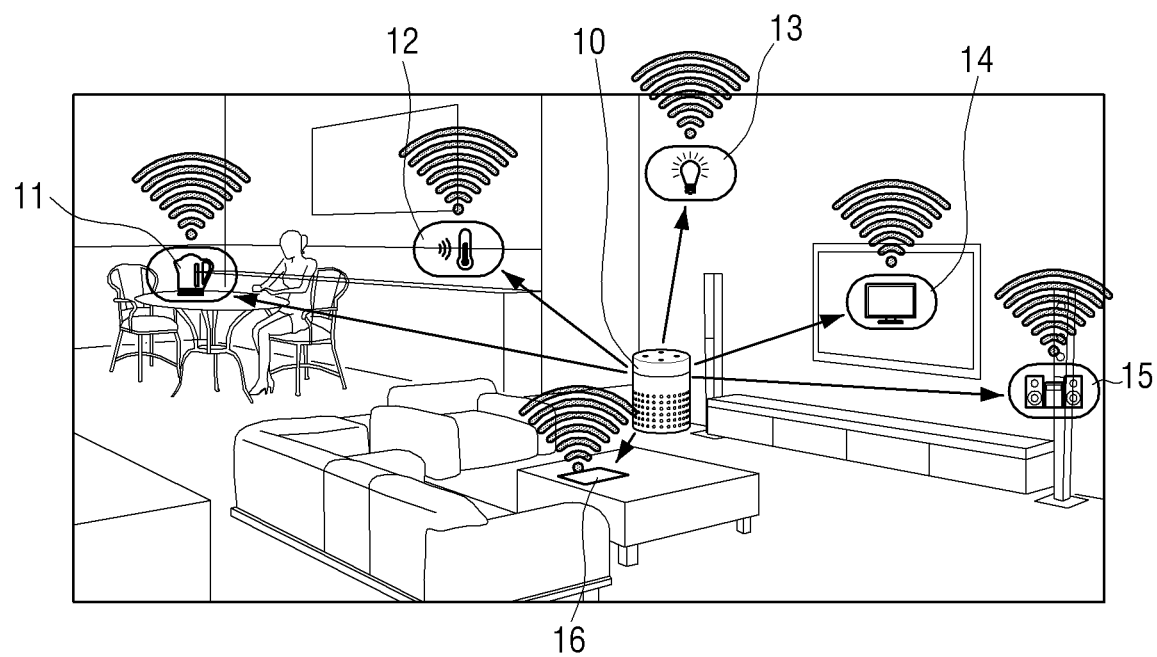
FIG. 1 is a diagram illustrating an example Internet of things (IoT) environment including an IoT hub device, according to the related art.

Example embodiments of the present disclosure are described in greater detail with reference to the accompanying drawings. However, it should be understood that the present disclosure is not limited to the specific embodiments described hereinafter, but includes various modifications, equivalents, and/or alternatives of the various example embodiments of the present disclosure. In relation to explanation of the drawings, similar drawing reference numerals may be used for similar elements.

In the description, the term "has", "may have", "includes" or "may include" indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

If it is described that a certain element (e.g., first element) is "operatively or communicatively coupled with/to" or is "connected to" another element (e.g., second element), it should be understood that the certain element may be connected to the other element directly or through still another element (e.g., third element). Meanwhile, when it is mentioned that one element (e.g., first element) is "directly coupled" with or "directly connected to" another element (e.g., second element), it may be understood that there is no element (e.g., third element) present between the element and the other element.

In the description, the term "configured to" may be used interchangeably with, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, the phrase "processor configured to perform A, B, and C" may denote or refer, for example, and without limitation, to a dedicated processor (e.g., embedded processor) for performing the corresponding operations, a generic-purpose processor (e.g., CPU or application processor) that can perform the corresponding operations through execution of one or more software programs stored in a memory device, or the like.

Hereinafter, the present disclosure will be described in greater detail with reference to the accompanying drawings.

FIG. 1 is a diagram illustrating an example Internet of things (IoT) environment including an IoT hub device, according to the related art.

As illustrated in FIG. 1, in the home, numerous IoT devices such as an electric pot 11, a thermometer 12, a light 13, a smart TV 14, an audio system 15, a smartphone 16, and the like may be present. The IoT refers to a technology that mounts a sensor and a communication function in various objects and connect the objects to the Internet and thus, there is no limit to types of IoT devices that may be present in the home.

Meanwhile, the IoT environment in the home may include an IoT hub device 10. The IoT devices 11, 12, 13, 14, 15, 16 include a communication function, and thus may be connected to the IoT hub device 10 and controlled and managed by the IoT hub device 10.

The IoT hub device 10 illustrated in FIG. 1 may, for example, be a fixed-type speaker device which is capable of providing an interactive service, which may receive a voice command of a user and perform the corresponding operation. For example, when a user voice command for controlling the IoT devices 11, 12, 13, 14, 15, 16 is received, the IoT hub device 100 may transmit a control command to an IoT device to be controlled and perform an operation corresponding to the user voice command.

For example, when a user voice command "Play music" is received, the IoT hub device 10 may control the audio system to play music. When a user question "What is the temperature now?" is received, the IoT hub device 10 may request current temperature information to the thermometer 12 and output a response like "It's 20 degrees Celsius now."

A related-art fixed-type IoT hub device 10 may manage the IoT devices 11, 12, 13, 14, 15, 16 connected thereto, and control them. However, the related-art IoT hub device 10 may not identify exactly where the respective IoT devices 11, 12, 13, 14, 15, 16 are located in an actual home, and may merely transmit or receive information with the respective devices 11, 12, 13, 14, 15, 16. Thus, there is a limit to provide an IoT device location-based service.

For example, when a user command "Play music" is received, the related-art IoT hub device 100 may simply transmit a music playback command to the audio system 15, but may not transmit an audio output command which is beam formed toward a user direction in consideration of a location, direction, height, etc. of the audio system 15 to the audio system 15. In addition, with respect to a user command "Turn on the air conditioner", the related-art IoT hub device 100 may merely turn on the power of the air conditioner (not illustrated) and set an air conditioner temperature with reference to a temperature on the thermometer 12, but may not control the air conditioner (not illustrated) to provide optimized and/or improved air toward a user direction in view of a location of the air conditioner (not illustrated), a direction in which the air conditioner (not illustrated) is disposed, etc.

Although it is possible to use location information of the IoT devices 11, 12, 13, 14, 15, 16 directly input to the IoT hub device 10 or input through the smartphone 16, it is cumbersome for the user to directly input location information of the IoT devices 11, 12, 13, 14, 15, 16, and when the user changes locations of the IoT devices 11, 12, 13, 14, 15, 16, it is necessary to input location information again.

In addition, it is possible to install a camera on the fixed-type IoT hub device 100 and to obtain location information of the IoT devices 11, 12, 13, 14, 15, 16 using an image captured by the camera, but there is a limit.

In FIG. 1, only IoT devices 11, 12, 13, 14, 15, 16 installed in the living room are illustrated. However, in general, a house is spatially divided into a bedroom, a living room, a bathroom, a balcony, etc. as illustrated in the example in-home map illustrated in FIG. 2. Accordingly, it is difficult for the fixed-type IoT hub device 10 disposed in the living room to identify locations of IoT devices disposed at a place other than the living room, even if a camera is used.

Accordingly, according to an example embodiment, it is possible to obtain accurate position information of the IoT devices 11, 12, 13, 14, 15, 16 in the home using a mobile home robot, and thereby an IoT device location-based service optimized and/or improved for the user can be provided.

Figure 3:
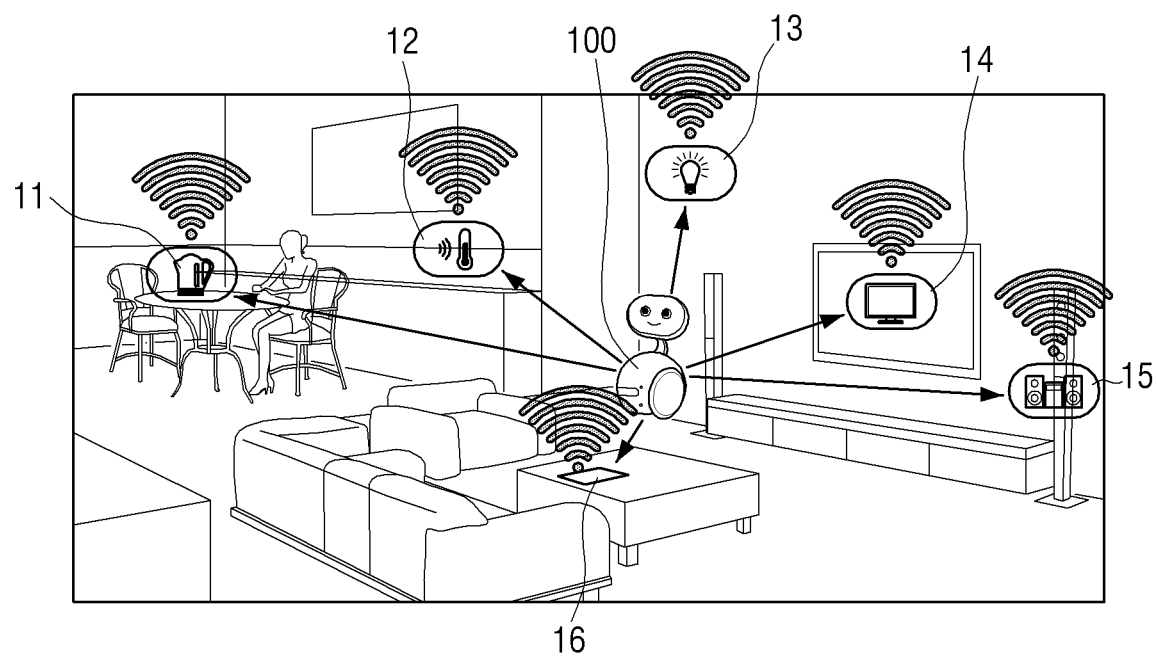
FIG. 3 is a diagram illustrating an IoT environment, according to an example embodiment.

FIG. 3 is a diagram illustrating an IoT environment, according to an example embodiment. Referring to FIG. 3, instead of the fixed-type hub device 10 of FIG. 1, a mobile home robot 100 is operated as an IoT hub device.

Figure 2:
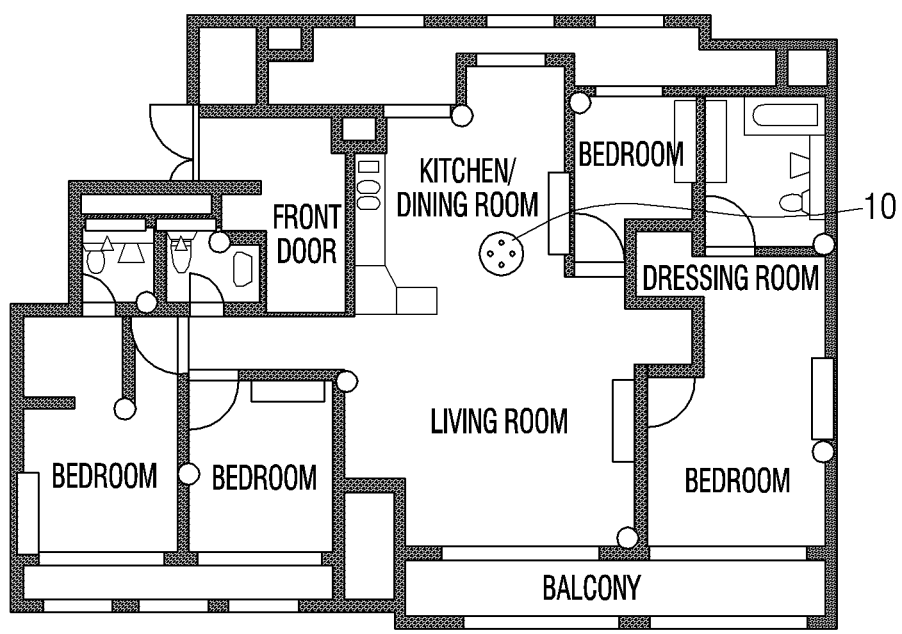
FIG. 2 is a diagram illustrating an example in-house map.

The mobile home robot 100 may move by itself from one position to another rather than being fixed in one place and used. Accordingly, the mobile home robot 100 may generate and/or update in-home map data while moving around the house, generate location information of IoT devices 11, 12, 13, 14, 15, 16 installed in the home, and map the generated location information with the map data and manage it. Even if IoT devices are respectively installed in various divided spaces as illustrated in FIG. 2, the mobile home robot 100 may move around each of the spaces and obtain location information of the IoT devices installed in each space, and map the obtained location information with map data.

In addition, the mobile home robot 100 may regularly update map data while moving around the house, and may update location information of an IoT device together with the map data to manage the changed latest location information even if the user changes the installation location of the IoT device.

Accordingly, the mobile home robot 100 may use the location information of the IoT devices mapped with the map data to thereby provide an optimum and/or improved IoT device location-based service which may be customized for the user.

In FIG. 3, the mobile home robot 100 is an IoT hub device, but the example is not limited thereto. For example, even in a case in which the fixed-type IoT hub device 10 is separately present as illustrated in FIG. 1, the mobile home robot 100 may generate and manage map data with which the location information of IoT devices are mapped, and provide an IoT device location-based service using the map data with which the location information of the IoT devices is mapped. In this case, if a user command is received, the mobile home robot 100 may control the IoT devices via the IoT hub device 10, or may directly control the IoT devices.

Figure 4:
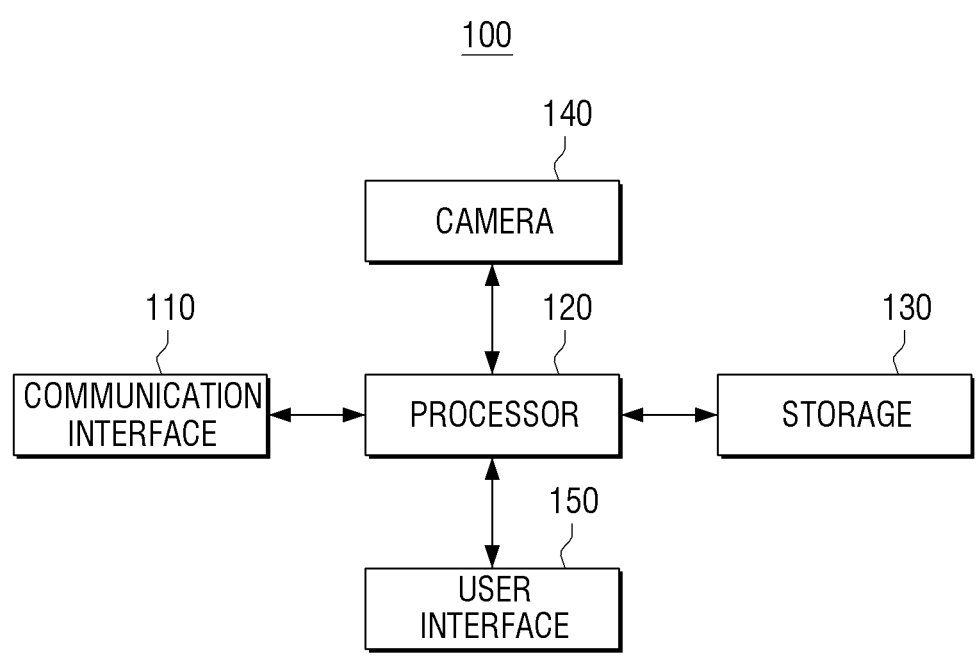
FIG. 4 is a block diagram illustrating a mobile home robot, according to an example embodiment.

FIG. 4 is a block diagram illustrating a mobile robot, according to an example embodiment. Referring to FIG. 4, the mobile home robot 100 may include a communication interface (e.g., including communication interface circuitry) 110, a processor (e.g., including processing circuitry) 120, a storage 130, a camera 140, and a user interface 150.

The communication interface 110 may include various communication interface circuitry and be controlled by the processor 120 to communicate with various types of external devices according to various wired or wireless communication methods. For example, the communication interface 110 may communicate with various servers via a network such as the Internet and the like. In addition, the communication interface 110 may also communicate with the in-home IoT devices 11, 12, 13, 14, 15, 16 and/or the IoT hub device 10 using various near field communication methods.

The storage 130 may store various programs and data for the operations of the mobile home robot 100. For example, the storage 130 may store device information (e.g., model name, type, serial number, MAC address, function, related URL, etc.) of IoT devices installed in the home (in this context, the IoT devices include a fixed-type IoT hub device), location information (e.g., coordinate information of an IoT device, size information, direction information, installation height information, etc.) of IoT devices generated by the processor 120, map data with which the location information of the IoT devices is mapped, semantic information relating to the location information of the IoT devices, map data with which the semantic information is mapped, and so on. In addition, the storage 130 may store a variety of databases and speech recognition modules that may be necessary for providing an interactive service to users. Accordingly, the processor 120 may provide an interactive service. In addition, the storage 130 may store a program module including various program elements necessary for context determination of the user.

The camera 140 may be controlled by the processor 120 to capture an external image. For example, the camera 140 may capture a surrounding image while the mobile home robot 100 moves around in the house. In addition, the camera 140 may be controlled by the processor 120 to track the user and capture an image. As described above, the captured image data may be provided to the processor 120.

The user interface 150 may, for example, be an element that enables the user to interact with the mobile home robot 100. The user may input a command to the mobile home robot 100 via the user interface 150, and recognize information output from the mobile home robot 100. To this end, the user interface 150 may include a variety of user input/output interfaces.

The processor 120 may include various processing circuitry and control the overall operations of the mobile home robot 100. For example, the processor 120 may, based on device information of a plurality of IoT devices installed in the home and an image captured through the camera 140 while the mobile home robot moves around in the house, generate location information of each of the plurality of IoT devices.

For example, the processor 120 may obtain device information of the plurality of IoT devices installed in the home. For example, the processor 120 may receive device information of the plurality of IoT devices installed in the home from an external IoT hub device 10 via the communication interface 110. In general, the IoT hub device 10 may store device information of IoT devices installed in the home because it manages the IoT devices. Accordingly, in a case in which an IoT hub device 10 is present, the processor 120 may request the IoT hub device 10 for the device information and obtain device information of the IoT devices installed in the home.

In addition, in a case in which the mobile home robot 100 is operated as an IoT hub device, the IoT devices may provide the device information to the mobile home robot 100 at the time of installation and registration of the mobile home robot 100. Accordingly, the processor 120 may store the device information received from the respective IoT devices in the storage 130, and use the device information of the IoT devices stored in the storage 130 as necessary.

Meanwhile, the processor 120 may capture a surrounding image through the camera 140 while the mobile home robot 100 moves around in the home. Accordingly, the processor 120 may generate location information of each of the plurality of IoT devices based on the obtained IoT device information and the captured image.

For example, the processor 120 may obtain an image of each of the plurality of IoT devices from an external server based on the IoT device information. The IoT device information may, for example, and without limitation, include information relating to a model name, type, function, related URL, etc. of the corresponding IoT device. Thus, the processor 120 may obtain an image of the corresponding IoT device by accessing a web server managed by a vendor or manufacturer of the corresponding IoT device and/or through a web search via the communication interface 110.

Accordingly, the processor 120 may compare the obtained image with the image captured through the camera 100 and recognize the IoT device. As described above, when the IoT device is recognized in the captured image, the processor 120 may analyze the captured image and generate location information of the IoT device including, for example, and without limitation, at least one of coordinate information on in-home map data of the recognized IoT device, size information, direction information, and height information relating to a height at which the recognized IoT device is located.

Meanwhile, the processor 120 may, as described above, map the generated location information with the in-home map data and manage it. For example, the processor 120 may generate in-home map data based on information that the mobile home robot 100 obtained through various sensors (not illustrated; will be described in FIG. 5) or the camera 110 while moving around in the home. As described above, the generated map data may be managed as being stored in the storage 130.

As described above, the location information of the IoT device includes coordinate information and thus, the processor 120 may map the location information of the IoT device with a coordinate at which the corresponding IoT device is located on the map data.

In addition, the processor 120 may update in-home map data on predetermined cycles based on information that the mobile home robot 100 obtained through various sensors (not illustrated; will be described in FIG. 5) and/or the camera 110 while moving around in the home. The processor 120 may update location of the respective IoT devices together with the in-home map data. However, it is not necessary that the map data and the location information of the IoT devices are updated together, and the map data and the location information of the IoT devices may be respectively updated on separate cycles.

As described above, when the map data or the IoT device information are regularly updated, even if locations of mobile IoT devices (e.g., electric pot 11, thermometer 12, smartphone 16, speaker (not illustrated), etc.) are changed, it is possible to provide an optimum IoT device location-based service for the changed location.

Meanwhile, when a user command is received through the user interface 150, the processor 120 may provide an IoT device location-based service based on map data with which location information is mapped. In this regard, the IoT device location-based service may refer, for example, to the mobile home robot 100 performing a user command using location information of the respective IoT devices.

According to an example embodiment, when a user command for controlling one IoT device from among a plurality of IoT devices is received, the processor 120 may generate a control command corresponding to the user command based on a location of a user inputting the user command and location information of the one IoT device, and transmit the generated control command to the one IoT device.

For example, when a user voice command "Play music" is received through the user interface 150, the processor 120 may recognize the user voice command and determine that the audio system 150 including a music playback function is an IoT device to perform the user command. In addition, the processor 120 may determine a current location of a user uttering the voice command on current in-home map data. The processor 120 may capture the user through the camera 110, and analyze the captured image and determine a location of the user. However, the example is not limited thereto.

Accordingly, the processor 120 may generate a music playback command including a setting value for beam forming to be performed by the audio system 15 to provide an optimum and/or improved sound to the user based on the determined user position and location information of the audio system 15, and control the communication interface 110 to transmit the generated music playback command to the audio system 15.

According to another example embodiment, when a user command for controlling one IoT device from among a plurality of IoT devices is received, the processor 120 may determine whether it is appropriate for the one IoT device to perform an operation corresponding to the user command based on a distance between a user inputting the user command and the one IoT device.

Accordingly, when it is determined that it is appropriate for the one IoT device to perform the operation corresponding to the user command, the processor 120 may transmit a control command corresponding to the user command to the one IoT device. When it is determined that it is inappropriate for the one IoT device to perform the operation corresponding to the user command, the processor 120 may provide a notification informing that the one IoT device is not available to perform the user command through the user interface 150.

For example, when a user voice command "Play music" is received, the processor 120 may recognize the user voice command and determine that a speaker including a music playback function is an IoT device to perform the user command. In addition, the processor 120 may determine a current location of a user uttering the voice command on current in-home map data.

Accordingly, the processor 120 may determine a distance between the user and the speaker, and determine whether the speaker is appropriate for performing the user command "Play music" based on the determined distance. For example, if the distance between the user and the speaker is less than a predetermined distance, the processor 120 may determine that the speaker is appropriate. If the distance between the user and the speaker is greater than or equal to the predetermined distance, the processor 120 may determine that the speaker is inappropriate. The processor may determine that the speaker is appropriate if the user and the speaker are in the same space, and determine that the speaker is inappropriate if the user and the speaker are in different spaces (e.g., bathroom and living room).

When the speaker is determined to be appropriate to perform the user command, the processor 120 may control the communication interface 110 to transmit the music playback command to the speaker. If a distance between the speaker and the user is very far or it is determined that the speaker is inappropriate for performing the user command because the speaker is in the bedroom and the user is in the living room, the processor 120 may control the user interface 150 to output (display or voice output) a notification informing that the speaker is not currently capable of performing the music playback command.

The notification informing that the speaker is not currently capable of performing the music playback command may include a message regarding a reason why the speaker is not capable of performing a music playback command, such as "The speaker is in the bedroom now," or a message regarding an alternative, such as "Play music myself?" or "Bring speaker to living room?".

According to another example embodiment, the processor 120 may determine context information of a user based on a user image captured through the camera 110, and based on the determined user context information, control the communication interface 110 to transmit a control command to change an operation mode of at least one IoT device from among a plurality of IoT devices to the at least one IoT device.

For example, the processor 120 may determine a context of the user by capturing an image of the user. For example, the processor 120 may track eyes of the user through the camera 110 and, when the eyes have been closed for more than a predetermined time, determine that the user is sleeping. In addition, when the user is sitting on a chair and looking at a desk for more than a predetermined time, it may be determined that the user is reading.

As described above, when a user context is determined, the processor 120 may change operation modes of IoT devices based on map data with which location information of an IoT devices is mapped. For example, when it is determined that the user is sleeping in the bedroom, the processor 120 may lower lighting of the bedroom, and control all IoT devices installed in the other room to operate in sleep mode. In addition, when it is determined that the user is reading in the living room, the processor 120 may control the IoT devices installed in the living room to operate in reading mode, and turn off the IoT devices in the remaining space.

Meanwhile, according to an example embodiment, the processor 120 may share location information of IoT devices with the IoT devices. For example, the processor 120 may control the communication interface 110 to transmit the location information of the IoT devices and/or map data with which the location information of the IoT devices is mapped generated as described above to a smartphone of the user or an IoT device. In this case, the processor 120 may transmit the location information or the map data to the IoT devices every time the location information of the IoT devices are updated, but the example is not limited thereto.

As described above, when the location information of the IoT devices is shared, for example, the user may identify locations of the IoT devices in real time through a smartphone, and the respective IoT devices may be operated using the location of the other IoT devices.

Figure 5:
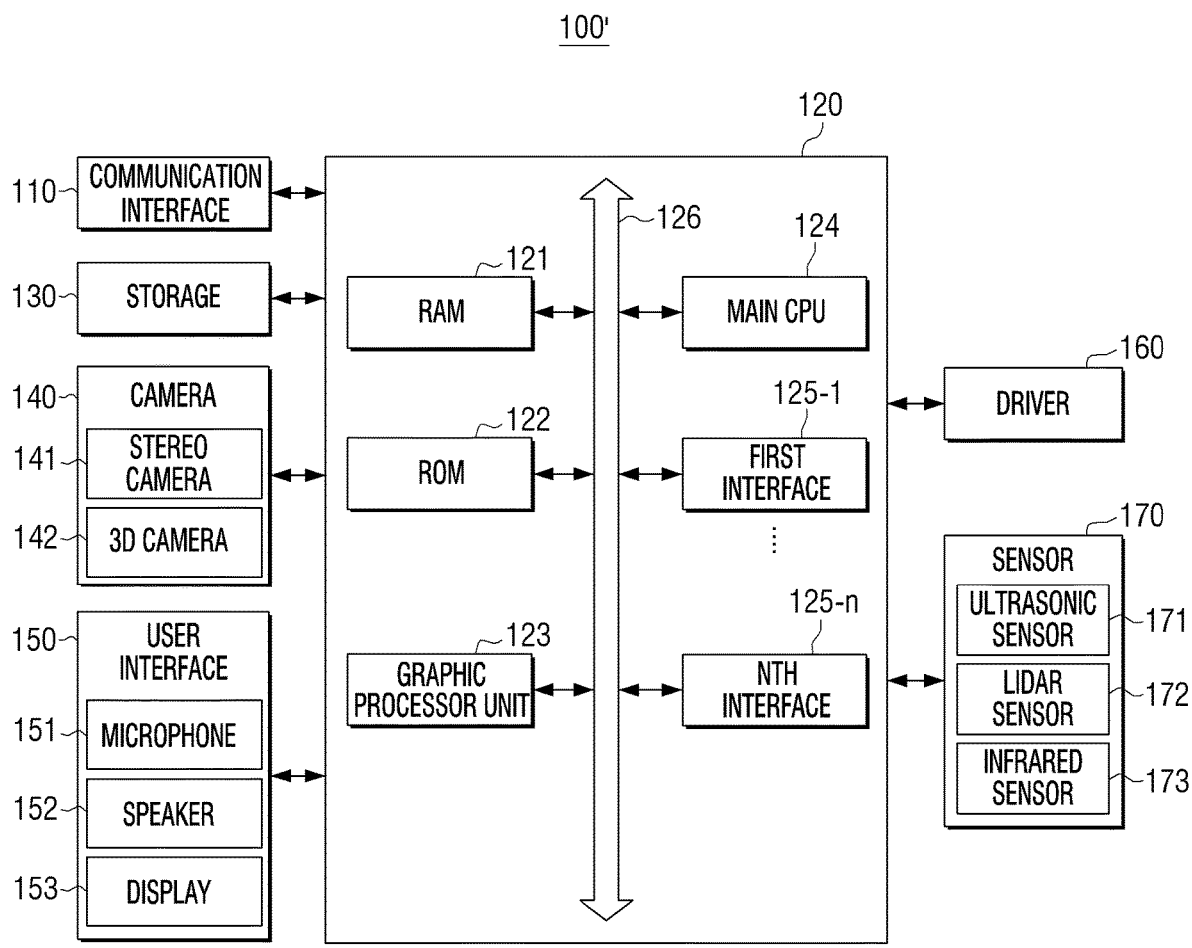
FIG. 5 is a block diagram illustrating an example configuration of a mobile home robot, according to an example embodiment.

FIG. 5 is a block diagram illustrating an example configuration of a mobile robot, according to an example embodiment. Referring to FIG. 5, a mobile home robot 100' may include a communication interface (e.g., including communication interface circuitry) 110, a processor (e.g., including processing circuitry) 120, a storage 130, a camera 140, a user interface 150, a driver 160, and a sensor 170. It is not necessary that all features illustrated in FIG. 5 are included in the mobile home robot 100', and some features may be omitted or other features may be further included according to an implementation of the mobile home robot 100'. For example, in a case in which the mobile home robot 100' is implemented as a mobile cleaning robot, a feature for performing a cleaning function may be further included, but the example is not limited thereto. Meanwhile, with reference to FIG. 4, descriptions of the same features as described above will not be repeated here.

The communication interface 110 may include various communication interface circuitry and communicate with a variety of external devices and transceive various information. For example, the communication interface 110 may communicate with IoT devices or an IoT hub device installed in the home. In addition, the communication interface 110 may communicate with various external servers via a network.

For this purpose, the communication interface 110 may include at least one communication module including various communication circuitry, including, for example, and without limitation, one or more of a near field wireless communication module (not illustrated) and a wireless LAN communication module (not illustrated). The near field wireless communication module (not illustrated) may refer, for example, to a communication module which performs data communication wirelessly with an external device located nearby, which may be, for example, a Bluetooth module, a ZigBee module, a near field communication (NFC) module, and etc. Further, the wireless LAN communication module (not illustrated) may refer, for example, to a module that is connected to an external network according to a wireless communication protocol such as WiFi, IEEE and the like to perform communications with an external server or an external device.

In addition, the communication interface 110 may further include a mobile communication module which accesses a mobile communication network and performs communication according to various mobile communication standards such as 3rd Generation (3G), 3rd Generation Partnership (3GPP), Long Term Evolution (LTE) and the like, and may further include a wired communication module (not illustrated) according to communication standards such as High-Definition Multimedia Interface (HDMI), Universal Serial Bus (USB), Institute of Electrical and Electronics Engineers (IEEE) 1394, RS-232, RS-422, RS-485, Ethernet and the like.

The storage 130 may store various programs and data. For example, the storage 130 may store in-home map data. In addition, the storage 130 may store an operation system (o/s) and various programs for performing operations of the mobile home robot 100'. To this end, the storage 130 may include a Random Access Memory (RAM), a Read Only Memory (ROM), a Solid State Disk (SSD), a flash memory, a hard disk or an optical disk, and so on, but is not limited thereto. In an implementation, the storage 130 may also be implemented as a cloud server or the like.

The camera 140 may capture an external image. For example, the camera 140 may capture an image in the home while the mobile home robot 110 moves around in the home. According to an example embodiment, the camera 140 may include, for example, and without limitation, at least one of a stereo camera 141 and a 3D camera 142.

Depth information extraction is available in an image captured through the stereo camera 141 and/or the 3D camera 142. Thus, the processor 120 may not only use two-dimensional coordinate information of an IoT device on the map data but also three-dimensional information including size information of the IoT device, information about a direction in which the IoT device is disposed, information about a height at which the IoT device is pre-installed and the like through an image captured using at least one of the stereo camera 141 and the 3D camera 142. Accordingly, it is possible to identify an accurate location of an IoT device, and thereby the processor 120 can provide an optimum and/or improved IoT device location-based service.

The user interface 150 may include a variety of user input/output interfaces. For example, as illustrated in FIG. 5, the user interface 150 may include, for example, and without limitation, one or more of a microphone 151, a speaker 152, and a display 153, but the example is not limited thereto. For example, a button or a touch screen may be included.

The microphone 151 may receive an external sound and convert the received external sound to an electrical signal. For example, the microphone 151 may receive a user voice command. The speaker 152 may output an electrical signal as a sound. For example, the speaker 152 may output a notification or various messages informing that an IoT device is not capable of performing a user command as a sound. The display 153 may display various images or contents. For example, an image may be of various formats including a still image, a moving image, an icon, a graphical user interface (GUI), an on screen display (OSD), and so on. For example, the display 153 may display a notification or various messages informing that an IoT device is not capable of performing a user command. To this end, the display 130 may be implemented in various forms, such as, for example, and without limitation, liquid crystal display (LCD), an organic light emitting diodes (OLED), an active-matrix organic light-emitting diode (AM-OLED), a plasma display panel (PDP), and the like.

The driver 160 may include various driver circuitry and drive the mobile home robot 100'. For example, the driver 160 may be controlled by the processor 120 to move the mobile home robot 100'. In this case, the driver 160 may include, for example, and without limitation, at least one pair of wheels that contact a floor surface, a motor that supplies power to the wheels, and a driver that controls the motor. As another example, the driver 160 may include a motor for performing an operation or the like of picking the object up.

The sensor 170 may include various sensors that sense a surrounding environment of the mobile home robot 100'. Referring to FIG. 5, the sensor 170 may include, for example, and without limitation, at least one of an ultrasonic sensor 171, a lidar sensor 172, and an infrared sensor 173, or the like.

The ultrasonic sensor 171 may refer, for example, to a sensor system for sensing a distance from a subject by radiating an ultrasonic wave onto the subject and sensing a reflected wave. The lidar sensor 172 may refer, for example, to a sensor system which is capable of obtaining information about a distance from an object by radiating a high power pulse laser having a particular frequency onto the object and measuring a time at which a reflected wave is received from the object. The infrared sensor 173 may refer, for example, to a sensor system for sensing a distance from an object by radiating an infrared ray onto the object and sensing a reflected wave.

According to an example embodiment, the processor 120 may generate in-home map data by applying a Simultaneous Localization and Mapping (SLAM) algorithm to information sensed through the ultrasonic sensor 171 and/or the lidar sensor 172, but the example is not limited thereto. For example, an image captured through the camera 140 may be used as well, to generate map data. Meanwhile, the infrared sensor 173 may be used for traveling of the mobile home robot 100' in the home, and/or may be used to receive a control signal of an external remote device (not illustrated), but the example is not limited thereto.

Although not illustrated in the drawings, according to an example embodiment of the sensor 170, various sensors such as, for example, and without limitation, an accelerometer sensor, a magnetic sensor, a gyroscope sensor, a barcode sensor, an obstruction sensor, a fall sensor, an impact sensor, a lift sensor, and the like may be further included, and the processor 120 may use information sensed through the respective sensors for operations of the mobile home robot 100'.

The processor 120 may control the overall operations of the mobile home robot 100'. For example, the processor 120 may control the mobile home robot 100' to perform the operations of the processor 120 described with reference to FIGS. 3-4.

To this end, the processor 120 may, for example, control hardware or software elements connected to the processor 120 by driving an operating system or application program, and perform various data processing and calculations. Further, the processor 120 may load and process a command or data received from at least one of the other components to a volatile memory and store diverse data in a non-volatile memory.

The processor 120 may be realized, for example, and without limitation, as a dedicated processor for performing functions (for example, embedded processor), a generic-purpose processor for performing functions by running one or more software programs stored in a memory device (for example, a CPU or an application processor), or the like.

The processor 120 may include the RAM 121, the ROM 122, a graphic processor unit (GPU) 123, a main central processing unit (CPU) 124, and first through nth interfaces 125-1 through 125-*n*. The RAM 121, the ROM 122, the GPU 123, the main CPU 124, and the first to the nth interface 125-1~125-*n* may be interconnected through the bus 126. The main CPU 124 may access the storage 130 and perform booting using the operating system (O/S) stored in the storage 130. The main CPU 124 may perform various operations by using various types of programs, contents, data, etc. stored in the storage 130.

The ROM 122 may store a set of instructions for system booting. If a turn-on command is input and the power is supplied, the main CPU 124 copies the O/S stored in the memory 130 into the RAM 121 according to the command stored in the ROM 122, and boots the system by executing the O/S. When the booting is completed, the main CPU 124 may copy the various programs stored in the storage 130 to the RAM 121, and perform various operations by implementing the programs copied to the RAM 121. In detail, the GPU 123 may, when booting of the mobile home robot 100' is completed, generate a screen that includes various objects such as an icon, an image, a text, and the like.

In particular, according to an example embodiment, the processor 120 may map semantic information regarding location information of each of the plurality of IoT devices with the map data. In this regard, the semantic information regarding the location information of each of the plurality of IoT devices may include location-related information such as front, rear, side and the like. For example, if an IoT device is a TV, the mobile home robot 100' may not identify the meaning of "front of TV". Accordingly, the processor 120 may map the "front of TV" on the map data based on location information of the TV. For example, the processor 120 may map an area of 1 m2 in the front direction based on the location of TV on the map data to correspond to the semantic information "front of TV." In the same manner, the semantic information such as rear and side may be mapped with the map data regarding location information of the respective IoT devices.

Accordingly, when a user voice command is received through the microphone 151, the processor 120 may perform an operation corresponding to the user voice command using the map data with which the semantic information is mapped. For example, when the user utters "Come to the front of the TV", the processor 120 may promptly move to the front of the TV by using the map data with which the semantic information is mapped.

In addition, when the user utters "Clean the front of the refrigerator", the processor 120 may transmit coordinate information corresponding to the front of the refrigerator to an automatic cleaner (not illustrated) using map data with which the semantic information is mapped, and thereby an operation corresponding to the user command can be promptly performed.

Meanwhile, the processor 120 may map semantic information with the map data. For example, referring to FIG. 2, the mobile home robot 100' may not identify the meaning of each of spaces in the home. For example, it may not be identified as to which space is a bedroom and which is a living room. Accordingly, the processor 120 may map semantic information "bedroom" with an area on the map data which corresponds to a space with a bed, and map semantic information "living room" in an area on the map which corresponds to a space with a couch. Thereby, it is possible to respond to a user command more promptly.

According to another example embodiment, the processor 120 may register a new IoT device. For example, according to the related art, a user installs a new IoT device, and registers the new IoT device by inputting setting information or location information of the corresponding IoT device using a smartphone or an IoT hub device. According to an example embodiment, a user may register a new IoT device through interaction with the mobile home robot 100'.

For example, when a user voice command for registration of a new IoT device is received, the processor 120 may obtain device information of the new IoT device from an external server based on an image of new IoT device captured through the camera 110, and provide an interactive service for the registration of the new IoT device based on the obtained device information of the new IoT device. Thereby, the user may register the new IoT device more easily.

For example, in a case in which an air conditioner is to be newly registered as an IoT device, the user may call the home robot 100' and utter "Register air conditioner". Accordingly, the processor 120 may capture an air conditioner or a model name, serial number, etc. of the air conditioner, and obtain device information of the corresponding air conditioner based on the captured air conditioner image.

The device information of the air conditioner may include information relating to a function and various setting items of the air conditioner. Accordingly, the processor 120 may output a question asking setting values of various setting items to the speaker based on the device information of the air conditioner, and when the user utters a response thereto, recognize the uttered response and reflect the corresponding content in the setting values. Thereby, the user can register the air conditioner more easily. Meanwhile, it is possible to install the air conditioner and newly map the location information of the air conditioner with the map data.

Figure 6:
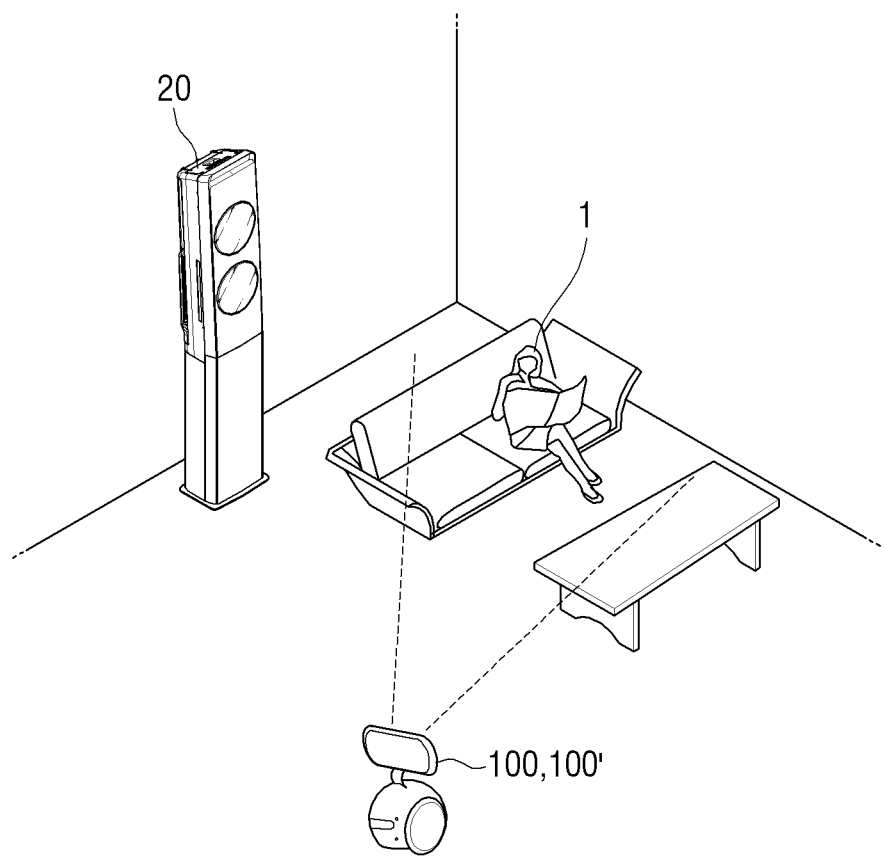
FIG. 6 is a diagram illustrating an IoT device location-based service of a mobile home robot, according to an example embodiment.

FIG. 6 is a diagram illustrating an IoT device location-based service of a mobile robot, according to an example embodiment. In FIG. 6, a user 1 is positioned in the living room and an air conditioner 20 is disposed in the living room. The mobile home robot 100 and 100' may map device information of IoT devices with map data in the user's home, and manage it. In such situation, when the user utters "Turn on the air conditioner", the mobile home robot 100 and 100' may recognize the utterance of the user, and provide an IoT device location-based service based on location information of the air conditioner 20.

For example, the mobile home robot 100 and 100' may capture the user and determine a position of the user and location of the air conditioner 20 on the map data. The location information of the air conditioner 20 may include not only coordinate information of the air conditioner 20 on the map data but also information about a direction to which the air conditioner 20 is disposed, size information, height information of the air conditioner, etc. Thus, the mobile home robot 100 and 100' may generate a control command corresponding to the "Turn on the air conditioner" based on the position of the user 1 and the location information of the air conditioner 20.

In this regard, the control command to be generated may not simply be a command to turn on a power of the air conditioner 20, but a control command including setting information regarding an air direction or air volume of the air conditioner 20. For example, according to an example embodiment, the mobile home robot 100 and 100' may identify a locational and directional relationship between the user 1 and the air conditioner 20, and thus may generate a control command based on the identified locational and directional relationship and transmit the generated control command to the air conditioner 20. Thereby, it is possible to perform an IoT device control which is optimized and/or improved for a user position. In FIG. 6, it is described that an IoT device is an air conditioner 20. However, it is possible to perform an optimized and/or improved IoT device control for a user position in a similar manner to a speaker, lighting which is capable of beam forming, etc.

Figure 7:
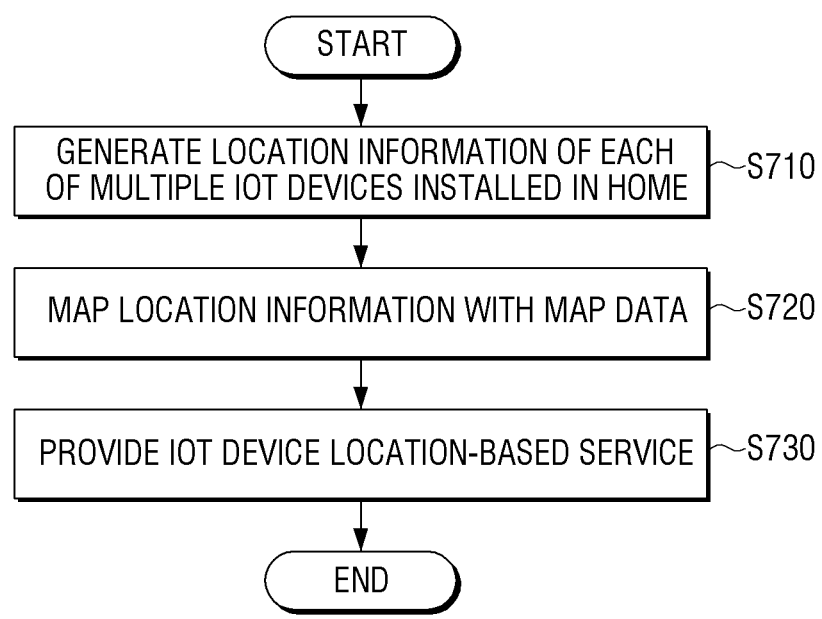
FIG. 7 is a flowchart illustrating a method of controlling a mobile home robot, according to an example embodiment.

FIG. 7 is a flowchart illustrating method of controlling a mobile robot, according to an example embodiment. Referring to FIG. 7, the mobile home robot 100 and 100' may, based on device information of a plurality of IoT devices installed in the home and/or an image captured through the camera 110 while the mobile home robot 100 and 100' moves around in the house, generate location information of each of the plurality of IoT devices, at operation S710.

For example, the mobile home robot 100 and 100' may obtain device information of IoT devices installed in the home. For example, the mobile home robot 100 and 100' may request an IoT hub device for device information of an IoT device and obtain the requested device information. In addition, in a case in which the mobile home robot 100 and 100' is operated as a hub device, it is possible to use IoT device information managed by the mobile home robot 100 and 100'.

As described above, when the device information of the IoT devices is obtained, the mobile home robot 100 and 100' may obtain an image of the respective IoT devices from an external server based on the obtained device information, and compare the obtained image with the captured image and recognize the respective IoT devices. Accordingly, the mobile home robot 100 and 100' may generate location information of the respective IoT devices recognized based on images captured through a camera 110.

In this regard, according to an example embodiment, the camera 110 may include, for example, and without limitation, at least one of a 3D camera and a stereo camera. The location information may include at least two of coordinate information of each of a plurality of IoT devices on map data, size information and direction information of each of the plurality of IoT devices, and information about a height at which each of the plurality of IoT devices is located.

Meanwhile, the mobile home robot 100 and 100' may map the location information generated as described above, with map data, at operation S720. In this regard, according to an example embodiment, the mobile home robot 100 and 100' may map semantic information regarding location information of each of the plurality of IoT devices with the map data.

Thereafter, when a user command is received, the mobile home robot 100 and 100' may provide an IoT device location-based service based on the map data with which the location information is mapped, at operation S730.

For example, when a user command for controlling one IoT device from among a plurality of IoT devices is received, the mobile home robot 100 and 100' may generate a control command corresponding to the user command based on a location of a user inputting the user command and location information of the one IoT device, and transmit the generated control command to the one IoT device.

As another example, when a user command for controlling one IoT device from among a plurality of IoT devices is received, the mobile home robot 100 and 100' may determine whether it is appropriate for the one IoT device to perform an operation corresponding to the user command based on a distance between a user inputting the user command and the one IoT device. Accordingly, when it is determined that it is appropriate for the mobile home robot 100 and 100' to perform the operation corresponding to the user command, the processor 100 may transmit a control command corresponding to the user command to the one IoT device. When it is determined that it is inappropriate for the one IoT device to perform the operation corresponding to the user command, the processor 120 may provide a notification informing that the one IoT device is not available to perform the user command through the user interface 150.

As another example, the mobile home robot 100 and 100' may determine context information of a user based on a user image captured through the camera 100, and based on the determined user context information, transmit a control command to change an operation mode of at least one IoT device from among a plurality of IoT devices to the at least one IoT device.

In addition, when a user voice command is received through the microphone 151, the mobile home robot 100 and 100' may perform an operation corresponding to the user voice command using the map data with which the semantic information is mapped.

In addition, the mobile home robot 100 and 100' may transmit the location information of the respective IoT devices or map data with which the location information of the respective IoT devices is mapped, to a smartphone of the user and/or at least one of the plurality of IoT devices, and share the map data.

According to another example embodiment, the mobile home robot 100 and 100' may update the map data and the location information of each of the plurality of IoT devices on a predetermined cycle based on information obtained while the mobile home robot 100 and 100' moves around in the home.

In addition, when a user voice command for registration of a new IoT device is received, the mobile home robot 100 and 100' may obtain device information of the new IoT device from an external server based on an image of new IoT device captured through the camera 110, and provide an interactive service for the registration of the new IoT device based on the obtained device information of the new IoT device.

According to the various example embodiments described above, a mobile home robot can automatically identify accurate locations of Internet of things (IoT) devices in the home. Accordingly, a user can be provided with a convenient and optimized and/or improved IoT device location-based service solely from interaction with a mobile home robot.

Meanwhile, the above-described example embodiments may be implemented as a software program containing one or more instructions stored on machine (e.g., computer)-readable storage media. The machine is an apparatus which is capable of calling a stored instruction from the storage medium and operating according to the called instruction, and may include a mobile home robot 100 and 100' according to the above-described example embodiments. When the command is executed by a processor, the processor may perform a function corresponding to the command directly or using other components under the control of the processor. The command may include a code generated by a compiler or a code executable an interpreter. A machine-readable storage medium may be provided in the form of a non-transitory storage medium.

According to an example embodiment, the method according to the above-described various example embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

Each of the components (e.g., module or program) according to the various example embodiments may include a single entity or a plurality of entities, and some of the corresponding sub components described above may be omitted, or another sub component may be further added to the various example embodiments. Alternatively or additionally, some components (e.g., module or program) may be combined to form a single entity which performs the same or similar functions as the corresponding elements before being combined. Operations performed by a module, a program, or other component, according to various example embodiments, may be sequential, parallel, or both, executed iteratively or heuristically, or at least some operations may be performed in a different order, omitted, or other operations may be added.

Although various example embodiments of the present disclosure have been illustrated and described, it should be understood that the present disclosure is not limited to the disclosed embodiments and may be variously changed without departing from the spirit and the scope of the present disclosure as defined, for example, in the appended claims and their equivalents.

What is claimed is:

1. A mobile home robot, comprising:
   a storage configured to store in-home map data;
   a communication interface comprising communication interface circuitry;
   a camera;
   a user interface; and
   a processor configured to:
   generate location information of each of a plurality of Internet of Things (IoT) devices based on device information of the plurality of IoT devices installed in the home and an image captured through the camera while the mobile home robot moves around in the home;
   map the generated location information with the map data; and
   in response to a user command for controlling one IoT device from the plurality of IoT devices being received through the user interface, identify location information of the one IoT device based on the map data with which the location information is mapped, identify a position of a user that input the user command based on one or more images captured through the camera, generate a control command corresponding to the user command based on the position of the user and the identified location information of the one IoT device, identify a distance between the user and the one IoT device based on the position of the user and the map data, identify whether it is appropriate that the one IoT device performs an operation corresponding to the user command based on the identified distance, and transmit the generated control command to the one IoT device through the communication interface based on identifying that it is appropriate that the one IoT device performs the operation corresponding to the user command, and provide a notification that the one IoT device is not capable of performing the operation corresponding to the user command through the user interface based on identifying that it is inappropriate that the one IoT device performs the operation corresponding to the user command.

2. The mobile home robot as claimed in claim 1, wherein the processor is configured to:
obtain an image of each of the plurality of IoT devices from an external server based on the device information;
recognize each of the plurality of IoT devices by comparing the obtained image with the captured image; and
generate location information of the each of the recognized plurality of IoT devices based on the captured image.

3. The mobile home robot as claimed in claim 1, wherein the camera includes at least one of: a three-dimensional (3D) camera and a stereo camera, and
wherein the location information includes at least two of: coordinate information of each of the plurality of IoT devices on the map data, size information of each of the plurality of IoT devices, direction information of each of the plurality of IoT devices, and information about a height at which each of the plurality of IoT devices is located.

4. The mobile home robot as claimed in claim 1, wherein the user interface includes a microphone, and
wherein the processor is configured to:
map semantic information regarding the location information of each of the plurality of IoT devices with the map data; and
perform an operation corresponding to the user command using the map data with which the semantic information is mapped based on a user voice command being received through the microphone.

5. The mobile home robot as claimed in claim 1, wherein the processor is configured to update the map data and the location information of each of the plurality of IoT devices on a predetermined cycle based on information obtained while the mobile home robot moves around in the home.

6. The mobile home robot as claimed in claim 1, wherein the processor is configured to transmit the location information and/or the map data with which the location information is mapped to a smartphone of a user and/or at least one of the plurality of IoT devices.

7. The mobile home robot as claimed in claim 1, wherein the processor is configured to:
identify a locational and directional relationship between the user and the one IoT device based on the position of the user and the identified location information of the one IoT device, and wherein the control command is generated based on the identified locational and directional relationship between the user and the one IoT device.

8. The mobile home robot as claimed in claim 1, wherein the processor is configured to:
determine context information of a user based on a user image captured through the camera; and
transmit a control command for changing an operation mode of at least one IoT device from among the plurality of IoT devices to the at least one IoT device.

9. The mobile home robot as claimed in claim 1, wherein the user interface includes a microphone and a speaker, and wherein the processor is configured to:
obtain device information of a new IoT device from an external server based on an image of the new IoT device captured through the camera in response to a user voice command for registration of a new IoT device being received; and
provide an interactive service for registration of the new IoT device based on the obtained device information of the new IoT device.

10. A method of controlling a mobile home robot, the method comprising:
generating location information of each of a plurality of Internet of Things (IoT) devices based on device information of a plurality of IoT devices installed in the home and an image captured through a camera included in the mobile home robot while the mobile home robot moves around in the home;
mapping the generated location information with in-home map data stored in storage included in the mobile home robot;
in response to a user command for controlling one IoT device from the plurality of IoT devices being received through a user interface of the mobile home robot, identifying location information of the one IoT device based on the map data with which the location information is mapped;
identifying a position of a user inputting the user command based on one or more images captured through the camera;
generating a control command corresponding to the user command based on the position of the user and the identified location information of the one IoT device;
identifying a distance between the user inputting the user command and the one IoT device based on the position of the user and the map data;
determining whether it is appropriate that the one IoT device performs an operation corresponding to the user command based on the distance; and
transmitting the generated control command to the one IoT device through a communication interface of the mobile home robot based on determining that it is appropriate that the one IoT device performs an operation corresponding to the user command; and
providing a notification that the one IoT device is not capable of performing the user command through the user interface based on determining that it is inappropriate that the one IoT device performs the operation corresponding to the user command.

11. The method as claimed in claim 10, wherein the generating the location information comprises:
obtaining an image of each of the plurality of IoT devices from an external server based on the device information;
recognizing each of the plurality of IoT devices by comparing the obtained image with the captured image; and
generating location information of the recognized each of the plurality of IoT devices based on the captured image.

12. The method as claimed in claim 10, wherein the camera includes at least one of: a three-dimensional (3D) camera and a stereo camera, and wherein the location information includes at least two of: coordinate information of each of the plurality of IoT devices on the map data, size information of each of the plurality of IoT devices, direction information of each of the plurality of IoT devices, and information about a height at which each of the plurality of IoT devices is located.

13. The method as claimed in claim 10, further comprising:
    mapping semantic information regarding the location information of each of the plurality of IoT devices with the map data, and
    performing an operation corresponding to the user command using the map data with which the semantic information is mapped based on a user voice command being received.

14. The method as claimed in claim 10, further comprising:
    updating the map data and the location information of each of the plurality of IoT devices on a predetermined cycle based on information obtained while the mobile home robot moves around in the home.

15. The method as claimed in claim 10, further comprising:
    transmitting the location information and/or the map data with which the location information is mapped to a smartphone of a user and/or at least one of the plurality of IoT devices.

16. The method as claimed in claim 10, wherein the method further comprises:
    identifying a locational and directional relationship between the user and the one IoT device based on the position of the user and the identified location information of the one IoT device, and wherein the control command is generated based on the identified locational and directional relationship between the user and the one IoT device.

17. The method as claimed in claim 10, further comprising:
    determining context information of a user based on a user image captured through the camera; and
    transmitting a control command for changing an operation mode of at least one IoT device from among the plurality of IoT devices to the at least one IoT device.

18. The method as claimed in claim 10, further comprising:
    obtaining device information of a new IoT device from an external server based on an image of the new IoT device captured through the camera in response to a user voice command for registration of a new IoT device being received; and
    providing an interactive service for registration of the new IoT device based on the obtained device information of the new IoT device.

* * * * *